(12) United States Patent
Inaba et al.

(10) Patent No.: US 8,840,350 B2
(45) Date of Patent: Sep. 23, 2014

(54) CORROSION PROTECTION OF MAGNESIUM COMPONENTS VIA FASTENER ISOLATION

(75) Inventors: Kouichi Inaba, West Bloomfield, MI (US); James C. O'Kane, Shelby Township, MI (US); Rinaldo M. Lucchesi, Rochester Hills, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 172 days.

(21) Appl. No.: 13/278,056

(22) Filed: Oct. 20, 2011

(65) Prior Publication Data

US 2013/0097848 A1    Apr. 25, 2013

(51) Int. Cl.
*F16B 43/00*  (2006.01)
*F16B 5/02*  (2006.01)

(52) U.S. Cl.
CPC ............ *F16B 5/0258* (2013.01); *F16B 43/001* (2013.01)
USPC ............................................. 411/546; 16/2.1

(58) Field of Classification Search
USPC ...................... 411/542, 546; 16/2.1
See application file for complete search history.

(56) References Cited

U.S. PATENT DOCUMENTS

| | | | |
|---|---|---|---|
| 2,643,904 A * | 6/1953 | Wehmanen | 411/542 |
| 3,204,989 A * | 9/1965 | Wilson | 285/50 |
| 5,255,647 A * | 10/1993 | Kiczek | 123/195 C |
| 5,322,740 A | 6/1994 | Ghosh | |
| 5,455,000 A | 10/1995 | Seyferth et al. | |
| 5,711,711 A * | 1/1998 | Schmidt, Jr. | 470/41 |
| 6,037,066 A | 3/2000 | Kuwabara | |
| 6,123,898 A | 9/2000 | Taimatsu et al. | |
| 6,129,143 A | 10/2000 | Hasegawa et al. | |
| 6,149,049 A | 11/2000 | Loftfield et al. | |
| 6,209,409 B1 * | 4/2001 | Kitahata et al. | 74/388 PS |
| 6,394,537 B1 | 5/2002 | DeRees | |
| 6,450,396 B1 | 9/2002 | Krajewski | |
| 6,485,242 B1 * | 11/2002 | Kikawa et al. | 411/369 |
| 6,659,702 B2 * | 12/2003 | Kitayama et al. | 411/546 |

(Continued)

FOREIGN PATENT DOCUMENTS

| | | |
|---|---|---|
| CN | 101285495 A | 10/2008 |
| CN | 201433962 Y | 3/2010 |
| CN | 201461703 U | 5/2010 |

OTHER PUBLICATIONS

State Intellectual Property Office of the People'S Republic of China, Office Action in Chinese Patent Application No. 201210399207.1, mailed May 5, 2014.

*Primary Examiner* — Flemming Saether
(74) *Attorney, Agent, or Firm* — Ingrassia Fisher & Lorenz, P.C.

(57) ABSTRACT

In accordance with exemplary embodiments, a system for isolating magnesium components from fastener devices is provided to prevent corrosion. The system comprises an isolation member of a metal other than magnesium and configured within a hole for receiving the fastener formed in a magnesium component. A compressible sealing washer having a first diameter is positioned over the hole and an isolation washer having a second diameter being less than the first diameter, and consisting of a similar metal as the isolation member, is placed over the compressible sealing washer. The fastener passes through the isolation washer, the compressible sealing washer and the isolation member within the hole, where is it tightened to compress the compressible sealing washer between the isolation member and isolation washer forming a water-tight seal around the hole to resist corrosion of the magnesium component.

20 Claims, 2 Drawing Sheets

(56) References Cited

U.S. PATENT DOCUMENTS

| | | | |
|---|---|---|---|
| 6,733,164 B1 | 5/2004 | Smith, Jr. | |
| 6,979,161 B2 * | 12/2005 | Ando et al. | 411/368 |
| 7,066,375 B2 | 6/2006 | Bolser | |
| 7,074,348 B2 | 7/2006 | Geer et al. | |
| 7,204,925 B2 * | 4/2007 | Matsumura et al. | 205/198 |
| 7,455,881 B2 | 11/2008 | Raybould et al. | |
| 7,686,554 B2 * | 3/2010 | Amann et al. | 411/352 |
| 2003/0219542 A1 | 11/2003 | Ewasyshyn et al. | |
| 2004/0045643 A1 | 3/2004 | Hewett et al. | |
| 2005/0173495 A1 | 8/2005 | Wastiaux et al. | |
| 2006/0130709 A1 | 6/2006 | Miksic et al. | |
| 2007/0241164 A1 | 10/2007 | Barnes et al. | |
| 2009/0155616 A1 | 6/2009 | Thamida | |
| 2010/0047037 A1 * | 2/2010 | Ishida et al. | 411/427 |
| 2010/0143746 A1 | 6/2010 | Song et al. | |
| 2012/0155988 A1 * | 6/2012 | Schumacher et al. | 411/369 |

\* cited by examiner

CORROSION PROTECTION OF MAGNESIUM COMPONENTS VIA FASTENER ISOLATION

TECHNICAL FIELD

The technical field relates generally to the field of corrosion prevention. More particularly, the invention relates to a system for isolation of magnesium components from fastener devices to prevent corrosion.

BACKGROUND

Magnesium is a useful alternative to aluminum, steel or other structural materials in many applications. For example, magnesium may be used for structural parts in automotive applications. This is due, at least in part, to magnesium's relatively high strength-to-weight ratio as compared to aluminum. In some instances, a part made from magnesium may be joined to a part made from another metal and/or another metal may be used to join together two magnesium parts. In either case, the magnesium part(s) may be susceptible to corrosion at an interface formed between the magnesium and the other metal when, for example, the interface is exposed to corrosive environments.

Corrosion can occur at the interface between devices formed of dissimilar metals due to galvanic action. In general, at the interface between dissimilar metals, the metal with a more negative potential corrodes preferentially. By way of example, when a device formed of magnesium is in physical contact with a device or fastener formed of steel, the magnesium device corrodes near the interface. This corrosion can be compounded if the corrosive environment is a wet environment such as a vehicle undercarriage, engine compartment or closures (e.g., doors) that are regularly exposed to the surrounding environment.

A conventional approach to protecting against galvanic corrosion in metals is to provide electrical insulation between the two devices. But insulating materials are not readily employable in certain applications. Other conventional approaches involve coatings. However, coatings can be difficult to apply in some applications and may be prone to wearing away.

Accordingly, it is desirable to provide corrosion protection for magnesium components of a vehicle. Also, it is desirable to provide corrosion protection that facilitates magnesium components being utilized in wet environments of a vehicle. Additionally, other desirable features and characteristics of the present disclosure will become apparent from the subsequent description taken in conjunction with the accompanying drawings and the foregoing technical field and background.

BRIEF SUMMARY

In accordance with exemplary embodiments, a system for isolating magnesium components from fastener devices is provided to prevent corrosion. The system comprises an isolation member of a metal other than magnesium and configured within a hole formed in a magnesium component for receiving the fastener. A compressible sealing washer having a first diameter is positioned over the hole and an isolation washer having a second diameter being less than the first diameter, and consisting of a similar metal as the isolation member, is placed over the compressible sealing washer. The fastener passes through the isolation washer, the compressible sealing washer and the isolation member within the hole, where is it tightened to compress the compressible sealing washer between the isolation member and isolation washer forming a water-tight seal around the hole to resist corrosion of the magnesium component.

In accordance with exemplary embodiments, a method for isolating magnesium components from fastener devices is provided to prevent corrosion. The method comprises positioning an aluminum sleeve within a hole formed in the magnesium component that will receive a fastener. A compressible sealing washer is adhered to one end of the aluminum sleeve. Next, the fastener is positioned through an aluminum washer, the compressible sealing washer and the aluminum sleeve. Finally, the compressible sealing washer is compressed by the aluminum sleeve by tightening the fastener and forming a water-tight seal around the hole between the aluminum washer and the aluminum sleeve.

DESCRIPTION OF THE DRAWINGS

The subject matter will hereinafter be described in conjunction with the following drawing figures, wherein like numerals denote like elements, and.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle mechanical parts and other functional aspects of the system (and the individual operating components of the system) may not be described in detail herein. It should also be understood that FIGS. 1-2 are merely illustrative and may not be drawn to scale.

Figure 1:
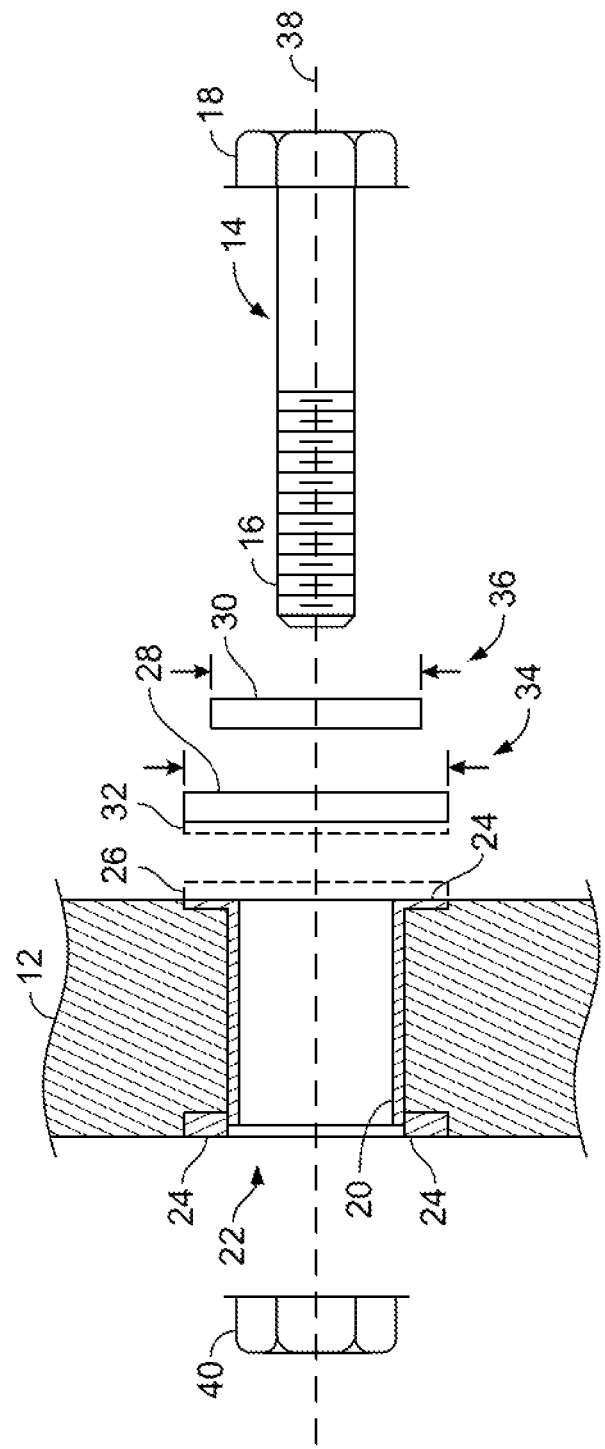
FIG. 1 is a pre-assembly exploded view illustration of the fastener isolation system according to exemplary embodiments of the present disclosure.
Figure 2:
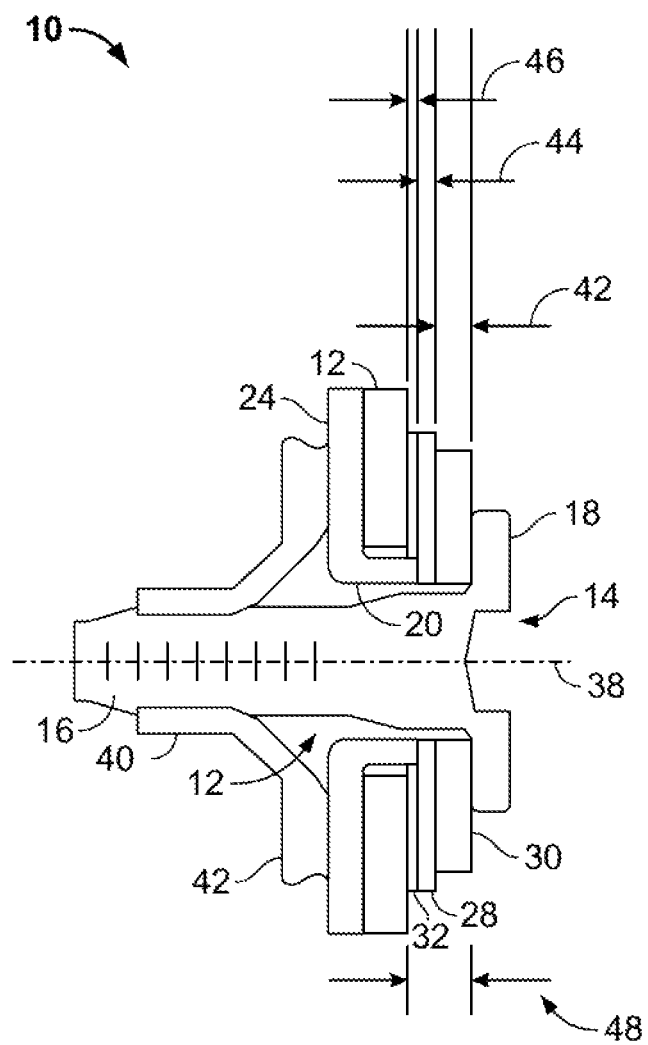
FIG. 2 is an illustration the assembled fastener isolation system according to exemplary embodiments of the present disclosure.

FIG. 1 is a pre-assembly exploded view illustration of a fastener isolation system 10 according to exemplary embodiments of the present disclosure. The fastener isolation system 10 contemplates coupling a magnesium (or magnesium alloy) component 12 via a fastener 14 (e.g., bolt, screw or rivet). In the illustrated embodiments, the fastener 14 comprises a bolt having a threaded portion 16 and a tightening portion 18. The tightening portion 18 may have a general hexagon shape to be tightened with a conventional wrench or socket. Generally, the fastener 14 comprises a dissimilar metal to the magnesium component 12. Typically, conventional fasteners are made of steel (or a steel alloy) which would react with the magnesium component causing corrosion of the magnesium.

Galvanic corrosion often occurs at an interface formed between dissimilar metals when the interface is exposed to corrosive environments. "Corrosive environments," as used herein, refers to any environment that includes a corrosive element. As an example, and not a limitation, corrosive elements include water, salt, acids, aqueous solutions containing oxygen, aqueous solutions containing chlorides, and the like. In the event that the corrosive environment is a wet environment (e.g., water or aqueous solution), galvanic corrosion may occur more rapidly and over a wider area since electrical conduction between the magnesium component 12 and the fastener 14 is facilitated. That is, galvanic corrosion occurs when the dissimilar metals are electrically connected to each other. The dissimilar metals assume different electrical potentials that tend to cause galvanic current to flow between the metals. In most cases, the less noble metal will act like an anode, and the more noble metal will act like a cathode. The galvanic current flows from the anode to the cathode thereby causing electrochemical dissolution of the anodic metal (i.e., the magnesium component 12).

According to exemplary embodiments of the present disclosure, the magnesium (or magnesium alloy) component 12 is fitted with an isolation member 20 at the location of receiving the fastener 14 (e.g., hole 22). Preferably, the isolation member 20 comprises a metal much less likely to cause galvanic corrosion with the magnesium component 12, such as aluminum (or an aluminum alloy). As can be seen in the cross-section illustration, the isolation member 20 surrounds the hole 22 formed in the magnesium component 12 and includes extended portions 24 around the hole 22 at the fastener interface surface of the magnesium component 12. The isolation member 20 is positioned in the hole 22 via a compression (press) fit operation or may be formed in the hole 22 during casting of the magnesium component 12. In some embodiments, the extended portions 24 of the isolation member 20 are flush with the surface of the magnesium component 12. Optionally, the extended portions 24 of the isolation member 20 may project slightly above the surface of the magnesium component 12 as indicated by reference numeral 26. In this embodiment, greater separation from the tightening portion 18 of the fastener 14 to the surface of the magnesium component is achieved without having to employ thick washers.

To limit water pooling around or intrusion into the hole 22, a compressible sealing washer 28 is employed. The compressible sealing washer 28 is compressed by an isolation washer 30 when the fastener 14 is tightened. In some embodiments, the isolation washer 30 comprises the same or similar material (e.g., aluminum or an aluminum alloy) as the isolation member 20. The compressible sealing washer 28 may be of any water resistant material, such as silicon, rubber, butyl, foam or adhesive impregnated mesh. In some embodiments, the compressible sealing washer 28 includes an adhesive layer 32 for fixation about the hole 22 for ease of assembly. In exemplary embodiments, the compressible sealing washer 28 has a diameter 34 that is slightly larger than the diameter 36 of the isolation washer 28. This assures a water-tight seal around the hole 22, while providing height isolation between the tightening portion 18 of the fastener 14 and the surface of the magnesium component 12. That is, the thickness of the compressible sealing washer 28 (when compressed) and the thickness of the isolation washer 30 provide height separation for corrosion resistance. In some embodiments, the minimum height separation distance is approximately three millimeters.

For assembly, the various components and members are coaxially aligned (as indicated by reference numeral 38) and the threaded portion 16 of the fastener 14 passes through the isolation washer 30, the compressible sealing washer 28 and the isolation member 20. For tightening, the threaded portion 16 of the fastener 14 is turned (rotated) against a retainer (e.g., nut) 40. In some embodiments, the threaded portion 16 of the fastener 14 may be received by another component (not shown) having mating threads formed therein facilitating coupling to the magnesium component 12.

FIG. 2 is an illustration the assembled fastener isolation system 10 according to exemplary embodiments of the present disclosure and wherein like reference numbers refer to like components. In the illustrated embodiment of FIG. 2, the fastener 14 is a screw and the retainer 40' comprises a tapped extrusion within a vehicle body member 42 (for example, a frame of a vehicle door latch). Other types of fasteners and retainers are, of course, possible. As noted above, the compressible sealing washer 28 and the isolation member 20 provide sufficient separation 48 of at least three millimeters. Accordingly, in this embodiment, the isolation washer 30 has a thickness 42 of 2 millimeters and compressible sealing washer 28 has a thickness 44 of 1.5 millimeters, that is compressed (as indicated at 46) by 0.5 millimeters when the fastener 14 is tightened. Thus, a separation 48 of three millimeters is achieved. Additionally, the isolation member 20 provides fastener-to-magnesium isolation through the hole 22 and to the retainer 40' via the projecting portions 24 of the isolation member 20. In this way, corrosion of the magnesium component 12 is reduced or eliminated by the fastener isolation system 10 of the present disclosure.

Accordingly, a fastener isolation system is provided for use in a vehicle that may be employed in wet environments of a vehicle such as the engine compartment, passenger door areas and for vehicle under-carriage applications.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A corrosion resistant fastening system for a magnesium component having a hole formed therein for receiving a fastener, comprising:
   an isolation member, consisting of a metal other than magnesium and configured within the hole in contact with the magnesium component;

a compressible sealing washer having a first diameter positioned over the hole;

an isolation washer having a second diameter being less than the first diameter and consisting of a similar metal as the isolation member, the isolation washer configured to contact the compressible sealing washer over the hole; and the fastener having a first portion thereof passing through the isolation washer, the compressible sealing washer and the isolation member within the hole;

wherein, the fastener compresses the compressible sealing washer between the isolation member and isolation washer when tightened forming a water-tight seal around the hole to resist corrosion of the magnesium component.

2. The corrosion resistant fastening system of claim 1, wherein the compressible sealing washer consists of silicon.

3. The corrosion resistant fastening system of claim 1, wherein the isolation member consists of aluminum or an aluminum alloy.

4. The corrosion resistant fastening system of claim 1, wherein the isolation member is configured within the hole during casting of the magnesium component.

5. The corrosion resistant fastening system of claim 1, wherein the isolation washer consists of aluminum or an aluminum alloy.

6. The corrosion resistant fastening system of claim 5, wherein the compressible sealing washer includes an adhesive layer for positioning the compressible sealing washer adjacent to the isolation member.

7. The corrosion resistant fastening system of claim 1, wherein the fastener consists of steel or a steel alloy.

8. The corrosion resistant fastening system of claim 7, wherein the fastener comprises one of the group of fasteners: bolt, screw or rivet.

9. A corrosion resistant fastening system for a magnesium component having a hole formed therein for receiving a fastener, comprising:

an isolation member, consisting of a metal other than magnesium and press-fit into the hole of the magnesium component;

a compressible sealing washer having a first diameter positioned over the hole;

an isolation washer having a second diameter being less than the first diameter and consisting of a similar metal as the isolation member, the isolation washer configured to contact the compressible sealing washer over the hole; and the fastener having a first portion thereof passing through the isolation washer, the compressible sealing washer and the isolation member within the hole;

wherein, the fastener compresses the compressible sealing washer between the isolation member and isolation washer when tightened forming a water-tight seal around the hole to resist corrosion of the magnesium component.

10. The corrosion resistant fastening system of claim 9, wherein the isolation washer consists of aluminum or an aluminum alloy.

11. The corrosion resistant fastening system of claim 9, wherein the compressible sealing washer includes an adhesive layer for positioning the compressible sealing washer adjacent to the isolation member.

12. The corrosion resistant fastening system of claim 9, wherein the fastener consists of steel or a steel alloy.

13. A corrosion resistant fastening system, comprising:

a magnesium member having a hole formed therein;

an aluminum member configured within the hole in contact with the magnesium member;

a compressible sealing washer having a first diameter positioned over the hole;

an aluminum washer having a second diameter being less than the first diameter and configured to contact the compressible sealing washer over the hole; and a fastener having a first portion thereof passing through the aluminum washer, the compressible sealing washer and the aluminum member;

wherein, the fastener compresses the compressible sealing washer between the aluminum washer and the aluminum member when tightened forming a water-tight seal around the hole to resist corrosion of the magnesium member.

14. The corrosion resistant fastening system of claim 13, wherein the aluminum member is press-fit into the hole of the magnesium member.

15. The corrosion resistant fastening system of claim 13, wherein the compressible sealing washer includes an adhesive layer for positioning the compressible sealing washer adjacent to the aluminum member and over the hole.

16. The corrosion resistant fastening system of claim 13, wherein the fastener consists of steel or a steel alloy.

17. The corrosion resistant fastening system of claim 16, wherein the fastener comprises one of the group of fasteners: bolt, screw or rivet.

18. A corrosion resistant fastening system, comprising:

a magnesium member having a hole formed therein;

an aluminum member configured within the hole during casting of the magnesium member;

a compressible sealing washer having a first diameter positioned over the hole;

an aluminum washer having a second diameter being less than the first diameter and configured to contact the compressible sealing washer over the hole; and a fastener having a first portion thereof passing through the aluminum washer, the compressible sealing washer and the aluminum member;

wherein, the fastener compresses the compressible sealing washer between the aluminum washer and the aluminum member when tightened forming a water-tight seal around the hole to resist corrosion of the magnesium member.

19. The corrosion resistant fastening system of claim 18, wherein the isolation washer consists of aluminum or an aluminum alloy.

20. The corrosion resistant fastening system of claim 18, wherein the compressible sealing washer includes an adhesive layer for positioning the compressible sealing washer adjacent to the isolation member.

* * * * *